(12) United States Patent
Hsiao et al.

(10) Patent No.: US 7,322,097 B2
(45) Date of Patent: Jan. 29, 2008

(54) METHOD OF MANUFACTURING A MAGNETIC HEAD HAVING SHORT POLE YOKE LENGTH

(75) Inventors: Richard Hsiao, San Jose, CA (US); Edward Hin Pong Lee, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 482 days.

(21) Appl. No.: 10/758,428

(22) Filed: Jan. 16, 2004

(65) Prior Publication Data

US 2005/0157432 A1    Jul. 21, 2005

(51) Int. Cl.
G11B 5/17 (2006.01)
G11B 5/187 (2006.01)

(52) U.S. Cl. ............... 29/603.24; 29/603.23; 29/603.07; 29/603.13; 360/122

(58) Field of Classification Search ............. 29/603.23, 29/603.24, 603.25, 603.07, 603.11, 603.13, 29/603.14; 360/119, 122, 123, 125, 126, 360/127
See application file for complete search history.

(56) References Cited

U.S. PATENT DOCUMENTS

| | | | |
|---|---|---|---|
| 6,043,959 A | 3/2000 | Crue et al. | 360/317 |
| 6,055,138 A | 4/2000 | Shi | 360/126 |
| 6,069,775 A | 5/2000 | Chang et al. | 360/126 |
| 6,130,809 A | 10/2000 | Santini | 360/317 |
| 6,158,107 A | 12/2000 | Chang et al. | 29/603.14 |
| 6,172,848 B1 * | 1/2001 | Santini | 360/122 X |
| 6,195,872 B1 * | 3/2001 | Sasaki | 29/603.13 |
| 2002/0176206 A1 * | 11/2002 | Sato | 360/126 |

FOREIGN PATENT DOCUMENTS

JP             1-128215     * 5/1989

* cited by examiner

Primary Examiner—A. Dexter Tugbang
(74) Attorney, Agent, or Firm—Robert O. Guillot; Intellectual Property Law Offices

(57) ABSTRACT

The induction coil of the magnetic head of the present invention is fabricated in a patterned electrical insulation material, preferably utilizing reactive ion etch (RIE) techniques. The electrical insulation material is particularly patterned such that it is formed away from the ABS surface and in the location of the induction coil. A fill layer is deposited around the patterned electrical insulation material layer, such that the fill layer is disposed at the ABS surface. In a preferred embodiment, the patterned electrical insulation material is initially fabricated from hard baked photoresist and subsequent to the deposition of the fill layer the hard baked photoresist material is removed and replaced by $SiO_2$. The $SiO_2$ is thereby located away from the ABS surface and the induction coil is subsequently fabricated within the $SiO_2$ material.

11 Claims, 10 Drawing Sheets

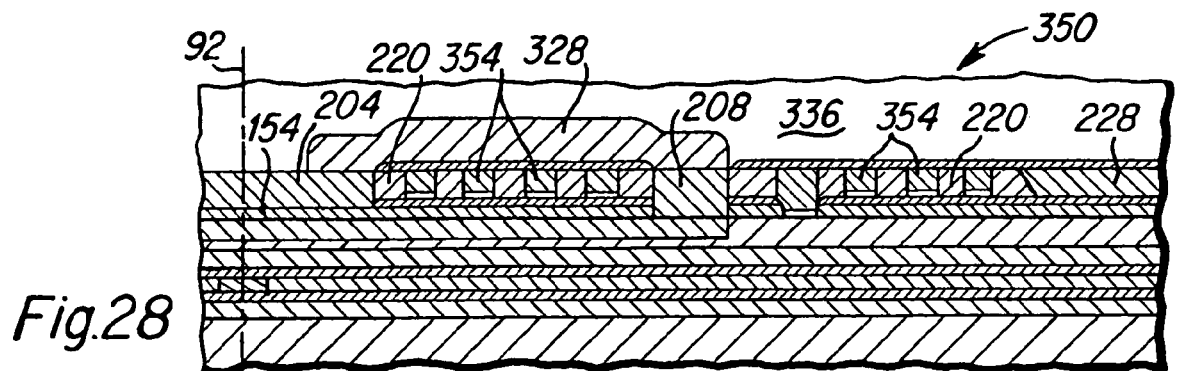
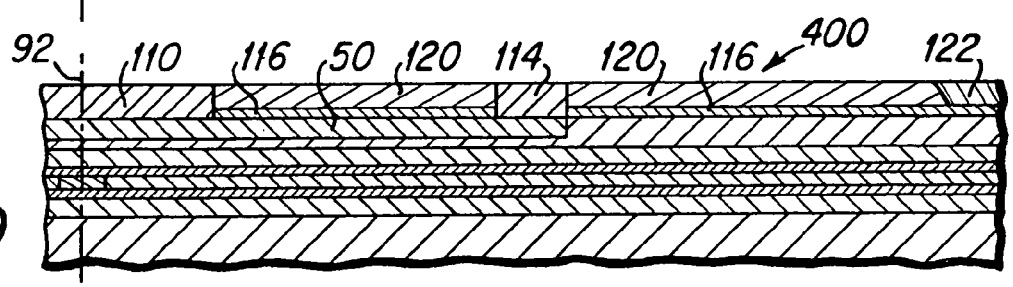
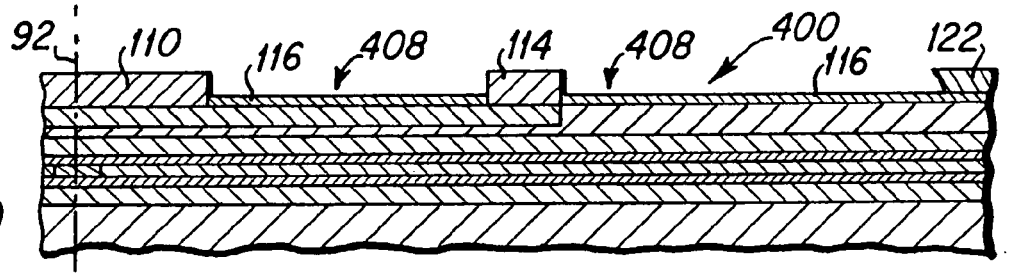
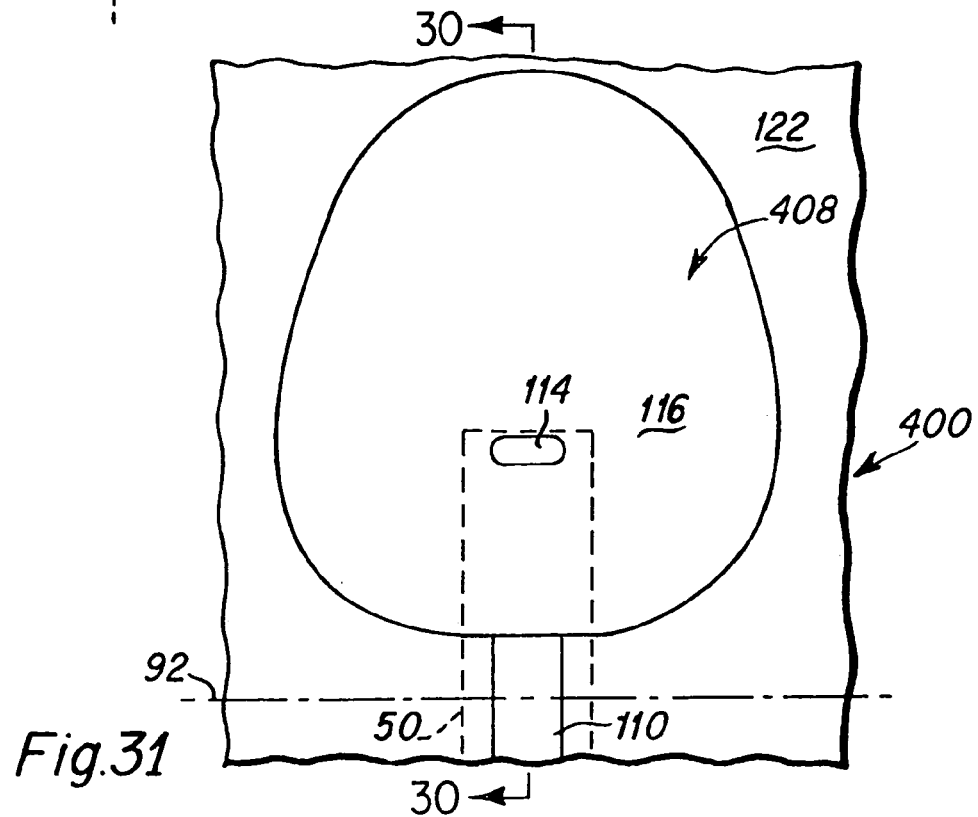

METHOD OF MANUFACTURING A MAGNETIC HEAD HAVING SHORT POLE YOKE LENGTH

BACKGROUND OF THE INVENTION

1. Field of the Invention

The present invention relates generally to magnetic heads for hard disk drives, and more particularly to magnetic heads having a fine pitch induction coil and a shortened P2 magnetic pole yoke length, and methods for the fabrication thereof.

2. Description of the Prior Art

It is a goal of the hard disk drive industry to develop magnetic heads that provide ever faster data writing speeds, such that increased quantities of data can be written onto the hard disk in shorter periods of time. Magnetic heads commonly include write heads having two magnetic pole members, generally referred to as the P1 pole and the P2 pole (which typically includes a P2 pole tip and a yoke portion), and a flat, spiral induction coil that is fabricated between the P1 and P2 poles. Write head electrical current that passes through the induction coil creates a magnetic flux in the two magnetic pole members, and the magnetic flux passes through the write head pole tip to create a magnetic field that writes magnetic data bits onto the media, such as a hard disk, that is disposed proximate the pole tip. To improve the performance characteristics of hard disk drives, efforts have been directed to increasing the speed with which data bits can be written by the magnetic head onto the magnetic media.

One of the parameters that controls the rate at which data can be written is the rate with which magnetic flux changes can be made by the write head. This flux change rate is in part controlled by the magnetic flux rise time of the write head, and the physical geometry of the write head, particularly the P2 pole yoke length, is one of the significant parameters that determines the magnetic flux rise time. Therefore, if the magnetic flux rise time can be shortened, such as by shortening the yoke length, the data writing rate of a magnetic head can be increased.

Prior art efforts to shorten the yoke length have lead to the development of multiple layered induction coils. However, such multiple layer induction coils, as are known in the prior art, are generally difficult to reliably fabricate. Specifically, the prior art multiple layer coil fabrication methods have generally employed well known photolithographic techniques which limit the definition of the induction coil line width. In addition, it is also difficult to remove the plating seed layer between the coil turns when the coil pitch is very small. Other methods that utilize image transfer techniques have resulted in problems related to the difficulty of removing photoresist materials and/or $SiO_2$ electrical insulation material from areas proximate the air bearing surface (ABS) of the magnetic head.

The present invention utilizes a reactive ion etching fabrication technique to achieve better physical characteristics for write head pole components including a shortening of the yoke length, whereby the magnetic flux rise time of the magnetic head is reduced, such that the data writing rate of the magnetic head is increased.

SUMMARY OF THE INVENTION

The magnetic head of the present invention includes an induction coil having coil turns that are more accurately and reliably spaced due to the use of reactive ion etching (RIE) fabrication techniques. In one embodiment, following the fabrication of the first magnetic pole (P1) together with a P1 pole pedestal piece and a first back gap piece, an etch stop layer is deposited. Thereafter, a patterned layer of an etchable electrical insulation material, such as hard baked photoresist is fabricated in the induction coil location and particularly away from the ABS surface. This is followed by the deposition of an $Al_2O_3$ fill layer across the wafer surface and a CMP step. An induction coil is then fabricated into the electrical insulation material and a patterned write gap layer is deposited. In this single coil embodiment, a flat P2 pole, including a P2 pole tip portion and a yoke portion, is then fabricated on top of the write gap layer. The fabricated magnetic head will have a fine pitch coil due to the use of RIE techniques, and the ABS surface will include the P1 pole, the P1 pole pedestal and the P2 pole tip surrounded by the $Al_2O_3$ deposited material. No RIE etchable material will have been deposited at the ABS surface, and the subsequent polishing of the ABS surface is thereby facilitated.

In a multilayer coil second preferred embodiment, a second induction coil layer is fabricated above the write gap layer in electrical connection with the first induction coil layer. To accomplish this, starting after the deposition of the write gap layer, a P2 pole tip and second back gap piece are next fabricated. Thereafter, a second patterned layer of etchable electrical insulation material is fabricated in the induction coil location, and particularly away from the ABS surface (as was done with the first electrical insulation layer). This is followed by the deposition of an $Al_2O_3$ fill layer across the wafer surface and a further CMP step. A second induction coil is then fabricated within the electrical insulation material, followed by a patterned insulation layer and the fabrication of the P2 pole yoke piece. No RIE etchable material will have been deposited at the ABS surface, and the subsequent polishing of the ABS surface is thereby facilitated. The RIE fabrication techniques of the present invention thus facilitate the formation of fine pitched induction coils which allow for a shortening of the yoke length of the P2 pole.

A further magnetic head embodiment has a single induction coil layer fabricated above the write gap layer, between a P2 pole tip and a back gap piece. The RIE fabrication techniques described herein are employed to create it.

In an improved further magnetic head embodiment of the present invention, the induction coil (or multiple coil layers, depending upon the particular embodiment) is fabricated within an $SiO_2$ electrical insulation layer. In fabricating such a head, the patterned hard baked photoresist electrical insulation layer is removed following the deposition of the $Al_2O_3$ fill layer. Following the removal of the hard baked resist electrical insulation layer, $SiO_2$ is deposited upon the wafer surface to fill the location previously occupied by the removed hard baked photoresist. Thereafter, the induction coil is fabricated into the $SiO_2$ layer. As with the hard baked photoresist embodiments, the RIE etchable $SiO_2$ electrical insulation layer is particularly fabricated away from the ABS surface, such that subsequent polishing of the ABS surface is facilitated. The $SiO_2$ electrical insulation possesses preferred thermal conductivity as compared to the hard baked photoresist, and thereby provides improved performance characteristics to the fine pitch induction coil magnetic heads of this embodiment of the present invention.

It is an advantage of the magnetic head of the present invention that the yoke length of the second magnetic pole of the write head element is reduced.

It is another advantage of the magnetic head of the present invention that the RIE etchable material in which the induction coil is fabricated is not deposited at the ABS surface of the magnetic head.

It is a further advantage of the magnetic head of the present invention that the magnetic flux rise time of the write head element is shortened.

It is yet another advantage of the magnetic head of the present invention that an increase in the data writing rate is achieved.

It is an advantage of the disk drive of the present invention that it includes a magnetic head wherein the yoke length of the second magnetic pole of the write head element is reduced.

It is another advantage of the hard disk drive of the present invention that it includes a magnetic head in which the RIE etchable material in which the induction coil is fabricated is not deposited at the ABS surface of the magnetic head.

It is a further advantage of the hard disk drive of the present invention that it includes a magnetic head in which the magnetic flux rise time of the write head element is shortened.

It is yet another advantage of the hard disk drive of the present invention that it includes a magnetic head in which an increase in the data writing rate is achieved.

It is an advantage of the method for fabricating a magnetic head of the present invention that the RIE etchable material in which the induction coil is fabricated is not deposited at the ABS surface of the magnetic head.

The foregoing and other objects, features, and advantages of the present invention will be apparent from the following detailed description of the preferred embodiment which makes reference to the several figures of the drawing.

IN THE DRAWINGS

FIG. 28 is a side cross-sectional view depicting another embodiment of the present invention;

FIGS. 29-38 are views depicting a further embodiment of the present invention;

DETAILED DESCRIPTION OF THE PREFERRED EMBODIMENTS

Figure 1:
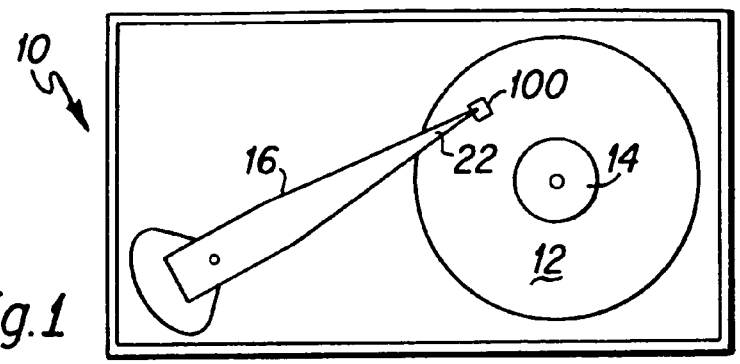
FIG. 1 is a simplified depiction of a hard disk drive of the present invention.

FIG. 1 is a top plan view that depicts significant components of a hard disk drive which includes the magnetic head of the present invention. The hard disk drive 10 includes a magnetic media hard disk 12 that is rotatably mounted upon a motorized spindle 14. An actuator arm 16 is pivotally mounted within the hard disk drive 10 with a magnetic head 100 of the present invention disposed upon a distal end 22 of the actuator arm 16. A typical hard disk drive 10 may include a plurality of disks 12 that are rotatably mounted upon the spindle 14 and a plurality of actuator arms 16 having a magnetic head 100 mounted upon the distal end 22 of the actuator arms. As is well known to those skilled in the art, when the hard disk drive 10 is operated, the hard disk 12 rotates upon the spindle 14 and the magnetic head 100 acts as an air bearing slider that is adapted for flying above the surface of the rotating disk. The slider includes a substrate base upon which the various layers and structures that form the magnetic head are fabricated. Such heads are fabricated in large quantities upon a wafer substrate and subsequently sliced into discrete magnetic heads 100.

Figure 2:
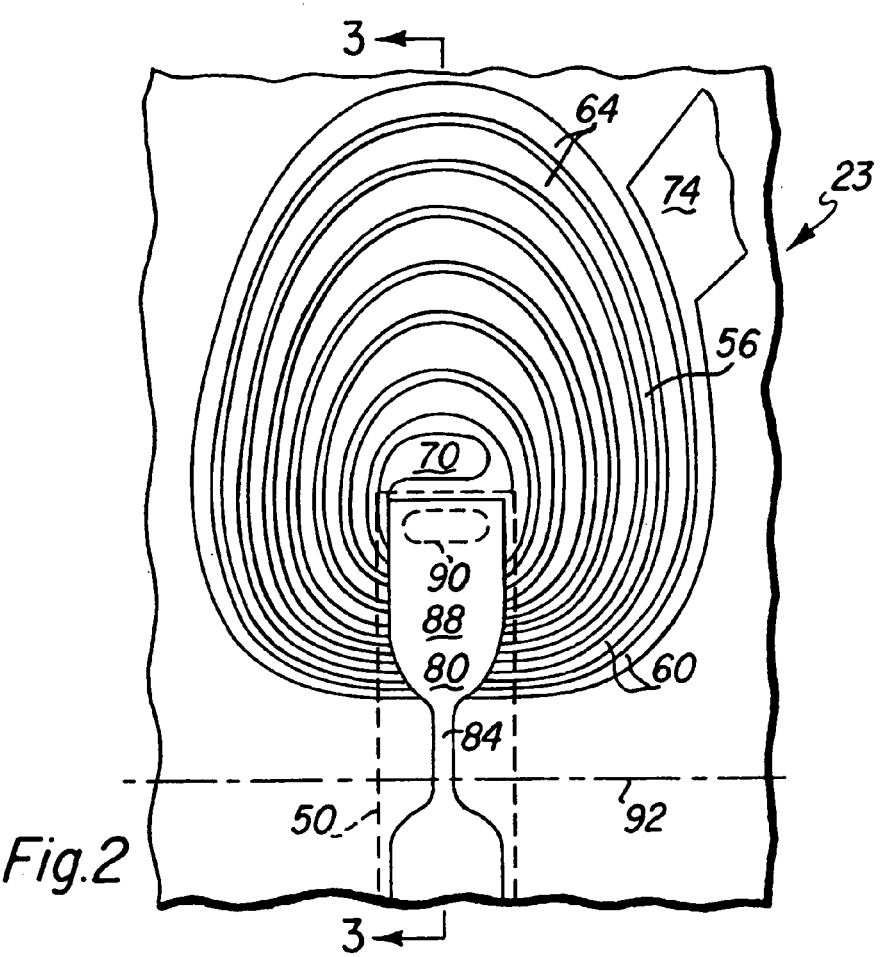
FIG. 2 is a top plan view depicting a typical prior art magnetic head and providing a view orientation that is utilized in the following figures and in describing the present invention.
Figure 3:
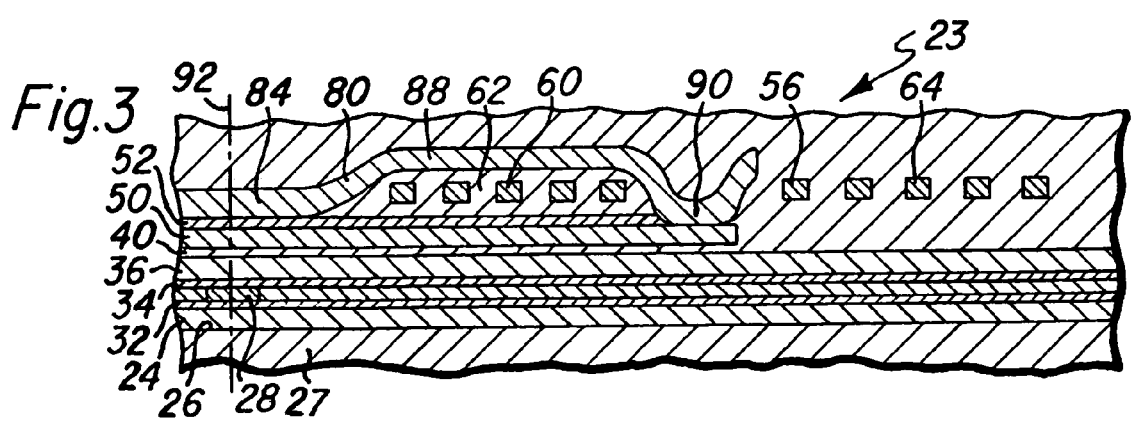
FIG. 3 is a side cross-sectional view taken along lines 3-3 of FIG. 2 of an initial fabrication step of the magnetic head of the present invention, which serves as a starting point for the detailed description thereof.

FIG. 2 is a top plan view of a typical prior art magnetic head 23, and FIG. 3 is a side cross-sectional view taken along lines 3-3 of FIG. 2. Referring to FIGS. 2 and 3, the prior art magnetic head 23 includes a read head magnetic shield (S1) layer 24 that is fabricated upon the upper surface 26 of a wafer substrate 27, a read head element 28 that is fabricated between insulation layers 32 and 34 upon the S1 shield 24, and a second magnetic shield (S2) layer 36 that is fabricated upon the upper insulation layer 34. A further insulation layer 40 is deposited upon the S2 shield 36 and a first magnetic pole (P1) layer 50 is next fabricated upon the insulation layer 40. As is also well known to those skilled in the art, in a type of magnetic head termed a merged head, the P1 pole layer 50 and the S2 shield layer 36 are merged into a single layer that performs the functions of the S2 shield 36 when the head is reading data from a hard disk, and performs the function of the P1 magnetic pole layer when the magnetic head is writing data to a hard disk. The insulative layer 40 is not present in such a merged head. The present invention, as is discussed below in detail, may be fabricated as a standard magnetic head or as a merged magnetic head, (although it is depicted herein as a standard magnetic head) as will be clear to those skilled in the art upon reading further.

The typical prior art magnetic head 23 depicted in FIGS. 2 and 3 further includes a patterned write gap layer 52 that is fabricated upon the P1 pole 50. Thereafter, a spiral, planar induction coil 56 is fabricated such that inner portions of a plurality of induction coil turns 60 formed with insulation 62 between them, are disposed above the P1 pole 50. Outer portions 64 of the induction coil turns complete the spiral induction coil 56. Typically, a first induction coil electrical interconnect 70 is formed in the central portion of the induction coil spiral, and a second electrical interconnect 74 is formed at the outer edge of the induction coil 56. Following the fabrication of the induction coil 56, a second magnetic pole (P2) 80 is fabricated above the induction coil 56. The second magnetic pole 80 includes a second magnetic pole tip 84 and a yoke portion 88, and the inner portions 60 of the induction coil traces pass between the P1 pole 50 and the P2 pole yoke 88. The yoke 88 is magnetically connected with the first pole 50 through a back gap piece 90. The magnetic head is later fabricated to include a polished air bearing surface (ABS) 92, as is well known by those skilled in the art.

When the write head current is fed through the electrical interconnects 70 and 74, and thus through the spiral coil 56, a magnetic flux is created within the two magnetic pole members 50 and 80 such that the magnetic flux passes across the write gap layer 52 between the P1 pole 50 and the P2 pole tip 84. The passage of the magnetic flux across the write gap creates a magnetic field that influences the magnetic media hard disk 12 that is disposed proximate the write gap in a hard disk drive 10, such that magnetic data bits are written onto the hard disk 12. The rate of change of the magnetic flux affects the data writing rate of the magnetic head, and the magnetic flux change rate is in turn affected by the magnetic flux rise time of the magnetic poles. Where the magnetic flux rise time is decreased the data writing rate is generally increased. These structures and features are well known to those skilled in the art and a further detailed description of them is not deemed necessary.

One of the physical parameters that controls the magnetic flux rise time is the length of the yoke 88 between the pole tip 84 and the back gap piece 90. Basically, where the length of the yoke is reduced, the magnetic flux flow path is reduced, and the magnetic flux rise time is thereby decreased. However, the yoke length cannot arbitrarily be shortened because several induction coil turns 60 must pass beneath the yoke 88 in order to provide the electromagnetic energy to the yoke that induces the magnetic flux within it. Therefore, a limiting factor in shortening the length of the yoke 88 is that several induction coils 60 must fit under the yoke, and the width of the coil turns, together with the insulation space 62 required between the coil turns thereby controls the length of the yoke 88.

Efforts have been undertaken in the prior art to increase the magnetic flux that is created in the two magnetic poles by increasing the number of induction coil turns that are fabricated between the two magnetic poles 50 and 88. Such efforts have included the fabrication of multiple layered induction coils, and the present invention includes but is not limited to a method for fabricating a multiple layer induction coil. Of course, where the same number of induction coil turns are fabricated in a multiple layer induction coil, as opposed to a single layer induction coil, the yoke length is reduced. The magnetic head 100 of the present invention includes improved coil fabrication techniques such that the magnetic head of the present invention has a finer pitch (coil turn to coil turn distance), and a shortened yoke length is thereby achieved. As a result, the magnetic head of the present invention has a decreased magnetic flux rise time and therefore achieves a faster data writing rate.

Figure 4:
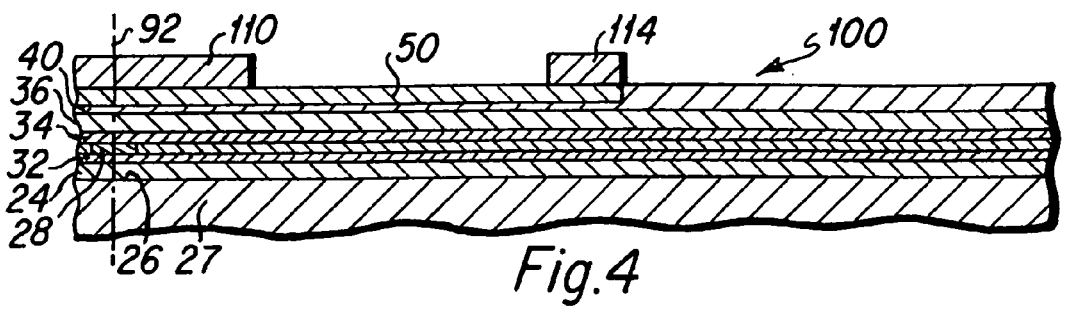
FIG. 4 is a side cross-sectional view of an initial fabrication step of the magnetic head of the present invention, which serves as a starting point for the detailed description thereof.

FIG. 4 provides a starting point in the description of the magnetic head embodiments of the present invention, and identical structures are numbered identically in subsequent figures of this disclosure. As depicted therein, a magnetic head embodiment 100 includes a first read head shield 24 that is disposed upon a surface 26 of a slider body 27. A read head element 28 is formed between insulation layers 32 and 34 and a second read head shield 36 is formed upon the insulation layer 34. An insulation layer 40 is fabricated above the second read head shield 36, and the P1 pole layer 50 is then fabricated upon the insulation layer 40. As described above, this basic structure of FIG. 4 is well known, and a detailed description of its various structural details is not necessary to an understanding of the present invention. That is, the present invention can be utilized with various read head element structures including the merged magnetic head structure described hereinabove.

The next step in the fabrication of a first preferred embodiment 100 of a magnetic head 20 of the present invention is the creation of a stepped P1 pole 110 as is depicted in FIG. 4. The stepped P1 pole is created by fabricating an additional raised P1 pole segment or pedestal 110 in magnetic connection with the P1 pole layer 50 proximate the ABS surface 92 of the magnetic head 100. The pedestal 110 is generally fabricated centrally above the read head element 28. Additionally, a P1 pole back gap piece 114 is also fabricated in magnetic connection with the P1 pole layer 50. The P1 pole pedestal 110 and back gap piece 114 may be fabricated utilizing a patterned photoresist and well known photolithographic techniques to plate the pedestal 110 and back gap piece 114 onto the P1 layer 50. Where photolithographic techniques are utilized, the pedestal 110 and back gap piece 114 may be fabricated from the same material as the P1 layer, such as Permalloy, or they may be preferably fabricated from another magnetic material, such as, but not limited to, NiFe 45/55 which has higher magnetic moment properties than Permalloy, and thus provides different performance characteristics to a magnetic head 100 that is fabricated using it. The thickness of the pedestal 110 and the back gap piece 114 will generally determine the thickness of induction coil members that are subsequently fabricated within the magnetic head 100, as are described herebelow.

Figure 5:
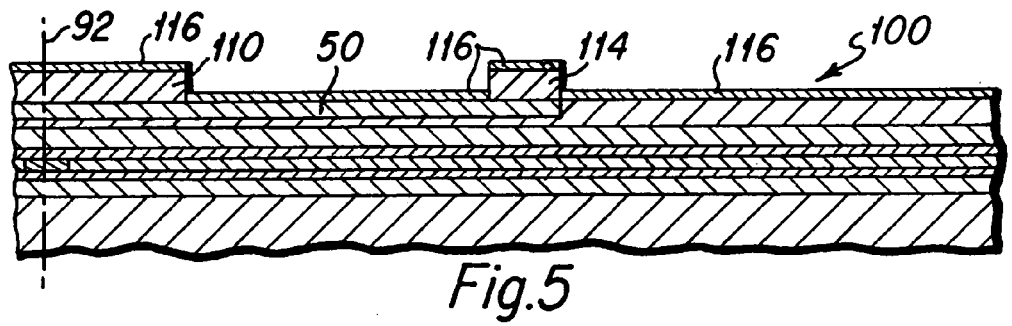
FIGS. 5-14 are views depicting further fabrication steps of a first embodiment of the present invention.
Figure 6:
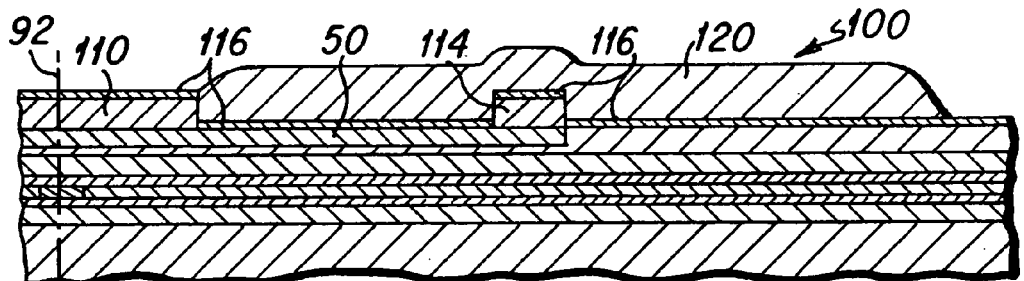

As depicted in FIG. 5, a thin film layer 116 is next deposited across the wafer surface and upon the device depicted in FIG. 4. The thin film layer 116 is composed of a material, such as alumina, that will act as an electrical insulation layer and as an etch stop material in a subsequent reactive ion etch (RIE) etching process that is described herebelow. Thereafter, as depicted in FIG. 6, a patterned electrical insulation layer 120 of hard baked photoresist is fabricated. As is best seen in the top view presented in FIG. 9 (and described herebelow), the patterned hard baked photoresist 120 is shaped to cover the area in which the spiral induction coil is to be fabricated, and the spiral induction coil trenches are subsequently fabricated into the hard bake photoresist 120. It is significant to note that the pattern of the hard baked resist 120 is specifically formed away from the ABS surface 92 that will subsequently be created in the fabrication of the magnetic head 100. This feature is particularly helpful in fabricating the magnetic head 100 of the present invention, in that it has proven difficult to effectively polish the ABS surface where RIE etchable material is located at the ABS surface.

Figure 7:
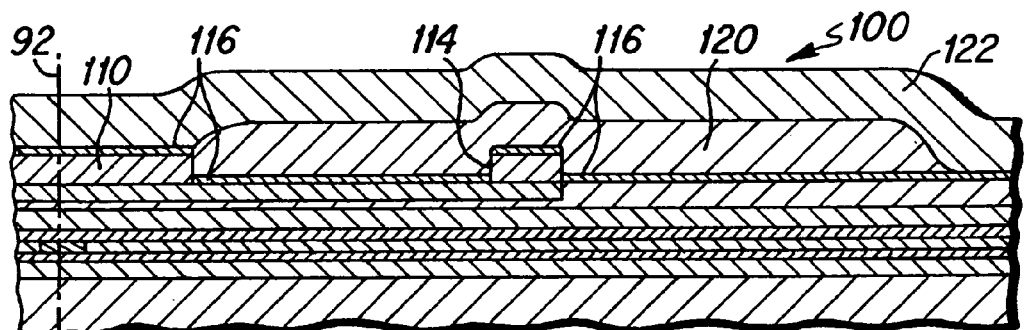
Figure 8:
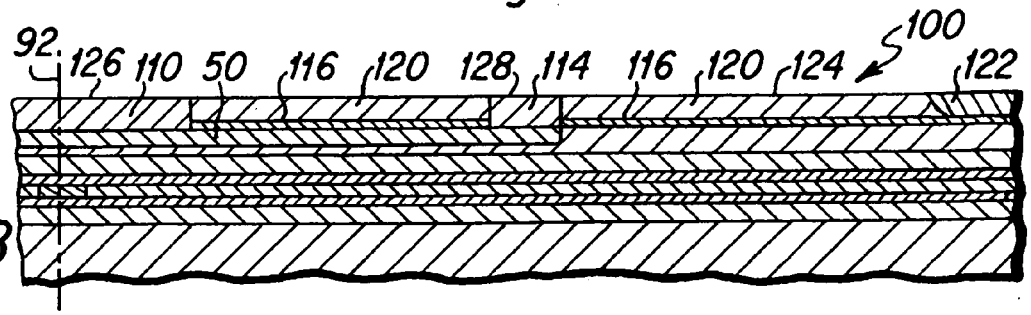
Figure 9:
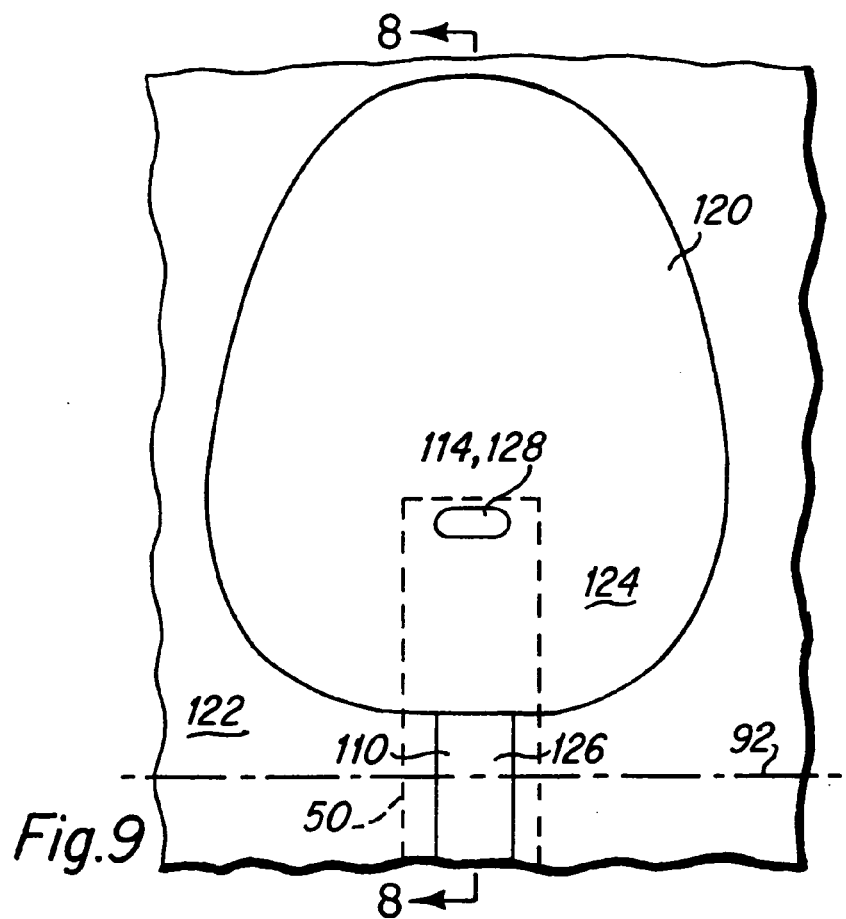
Figure 10:
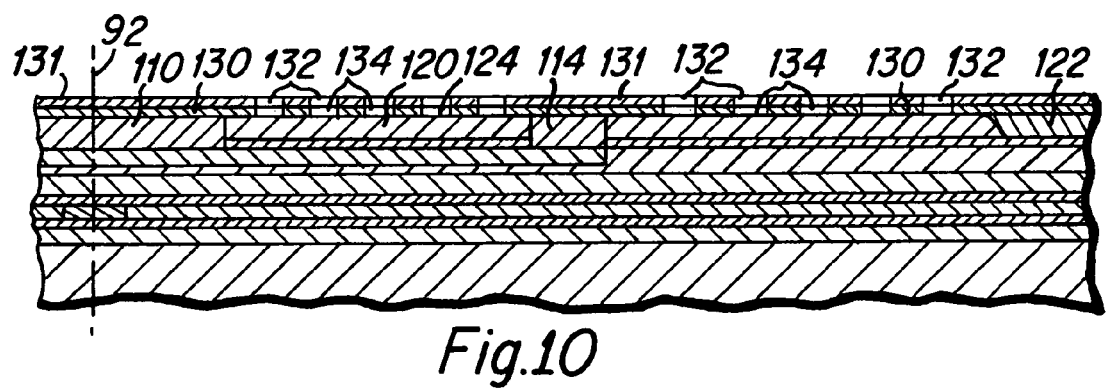

Exemplary materials of the photoresist layer 120 includes polymeric materials such as hard baked novolac or F-containing low k polymer, or similar photoresist insulation materials that can be hard baked yet readily etched in the RIE process that is to be conducted later. The thickness of the layer 120 is generally at least as thick as the P1 pedestal 110 which will correspond to the desired thickness of a first layer of induction coil traces that will be fabricated within the layer 120, as is described hereinbelow. As is depicted in FIG. 7, a layer of alumina fill 122 is next deposited across the surface of the wafer, preferably to a depth that exceeds the thickness of the P1 pedestal 110 and the back gap piece 114. As is next depicted in FIGS. 8 and 9, wherein FIG. 9 is a top plan view of FIG. 8, a CMP step is next conducted to remove excess alumina 122 and portions of the hard baked resist layer 120, and the portion of the etch stop layer 116 deposited on top of the P1 pedestal 110 and back gap 114, such that a flat surface 124 is formed and the upper surfaces 126 and 128 of the P1 pedestal 110 and back gap 114 respectively are exposed. Thereafter, as depicted in FIG. 10, a thin etching mask layer 130 is fabricated upon the flat upper surface 124 of the layer 120, and a thin photoresist layer 131 is then deposited upon the layer 130. A photolithographic step is next conducted in which induction coil pattern openings 132 are formed in the photoresist layer 131. Then a first RIE step is conducted with an appropriate etching species that forms corresponding coil pattern openings 134 in the mask layer 130 for fabricating induction coil trenches into the layer 120. It is advantageous that the RIE mask can be fabricated with a thickness of only approximately 0.5 microns, such that a fine pitch induction coil can more easily be fabricated.

Figure 11:
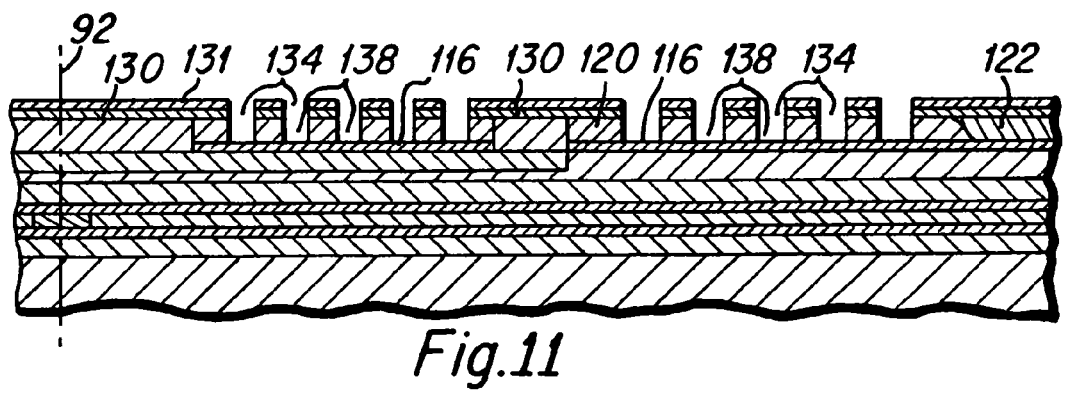

As depicted in FIG. 11, utilizing an ion etch process which is preferably an RIE process, induction coil trenches 138 are etched through the openings 134 in the mask 130 and downward through the layer 120 to the etch stop layer 116. Therefore, the relationship of the materials which comprise the RIE mask 130, the etch stop layer 116 and the hard baked photoresist layer 120 must be such that during the RIE step the material comprising the layer 120 is relatively easily etched, while the material comprising the RIE mask 130 and the etch stop layer 116 is significantly more slowly etched. By way of example, where the etchable insulation material layer 120 is composed of an organic polymer such as a hard baked resist, a reactive ion etch process utilizing a gas such as oxygen can be utilized, and the RIE mask 130 may be formed of materials such as TaO and $SiO_2$, and the etch stop layer 116 may consist of an electrical insulation material such as $Al_2O_3$.

Figure 12:
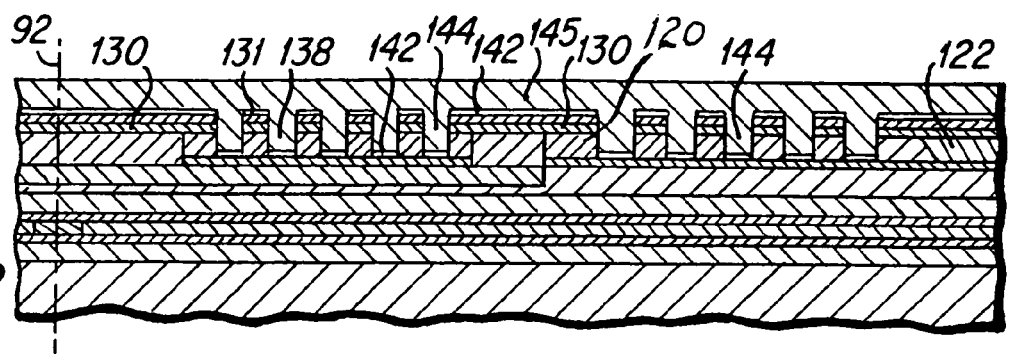
Figure 13:
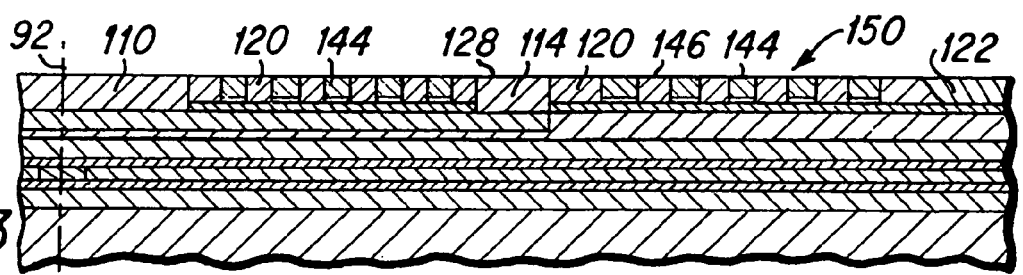

Thereafter, as depicted in FIG. 12, an induction coil structure is fabricated in the typical manner. That is, a seed layer 142, which may consist of sublayers of Ta, NiFe or Cr, followed by copper is sputter deposited onto the wafer to form a good electrical interconnection and physical bonding at the bottom of the trenches 138. The induction coil traces 144 which are typically composed of copper, are next fabricated in an electroplating process to fill the induction coil trenches 138 with copper 145. Alternatively, a chemical vapor deposition process may be used to deposit the copper. Thereafter, as depicted in FIG. 13, a chemical mechanical polishing step (CMP) is conducted to remove the excess copper 145 and the RIE mask 130, such that a flat upper surface 146 is formed. It is preferable that the CMP polishing step be conducted to expose the upper surface 126 of the P1 pole piece, and the upper surface 128 of the back gap piece 114, such that good magnetic flux flow through the magnetic poles of the magnetic head will be achieved. It can now be seen that a first induction coil layer structure 150 has been fabricated within the etchable insulation material layer 120. Due to the excellent process control parameters that are achievable by utilizing the reactive ion etch process described above, the induction coil traces 144 can be accurately fabricated with minimal spacing of insulative layer material 120 therebetween. Additionally, due to the use of the RIE process in fabricating the coil trenches 138 within the etchable insulation layer 120, the difficulty in removing the induction coil seed layer between coil lines, as is found in the prior art, is eliminated.

Figure 14:
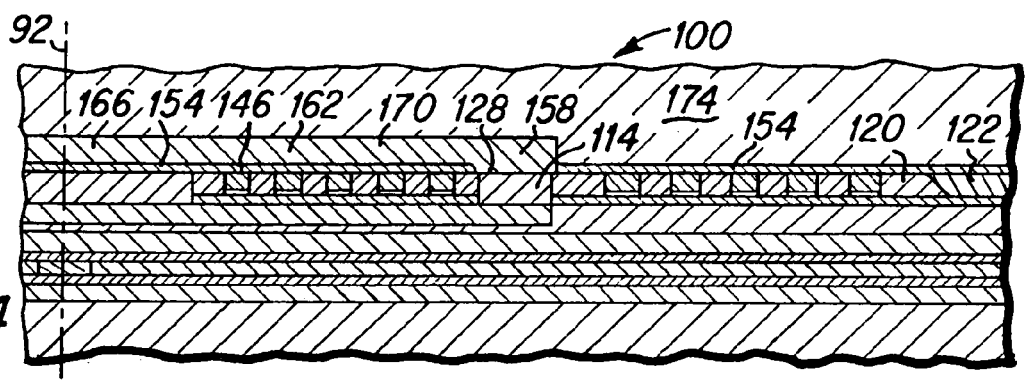

As is depicted in FIG. 14, a completed magnetic head 100 may next be fabricated by depositing a patterned write gap layer 154 upon the upper surface 146, such that an opening 158 is formed above the surface 128 of the back gap piece 114. Thereafter, a flat P2 pole 162, including a P2 pole tip portion 166 and a yoke portion 170 may be fabricated on top of the write gap layer 154 utilizing standard photolithographic techniques as are well known to those skilled in the art, such that the yoke portion 170 is deposited upon the upper surface 128 of the back gap piece 114. After conducting further fabrication steps, including encapsulation 174, as are well known to those skilled in the art, a magnetic head 100 of the present invention is completed.

A significant feature of the magnetic head 100 is that it is formed with a fine pitch induction coil that was fabricated utilizing RIE techniques, including a particularly patterned hard baked photoresist insulation layer 120 that was patterned such that it was fabricated away from the ABS surface 92 of the head (see FIG. 9).

Figure 15:
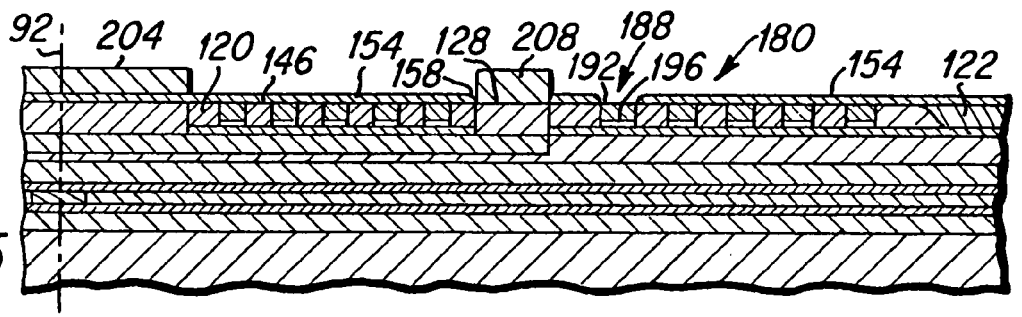
FIGS. 15-27 are views depicting fabrication steps of a second embodiment of the present invention.

A second preferred embodiment 180 of a magnetic head of the present invention having a multiple layer coil can now be described with the aid of FIGS. 15-27. Basically, having fabricated a first induction coil layer structure 150, a second induction coil layer can subsequently be fabricated upon the flat surface of the write gap layer 154, by essentially repeating the coil fabrication process described above. Particularly, as depicted in FIGS. 15, a patterned write gap layer 154 has been deposited upon the flat surface 146. The patterning of the write gap layer 154 provides an opening 158 to expose the upper surface 128 of the back gap piece 114, and an opening 188 to expose the upper surface 192 of a central induction coil trace pad 196 for a subsequent electrical connection thereto, as is well known to those skilled in the art. A magnetic P2 pole tip piece 204 is next formed upon the write gap layer 154, and a second back piece 208 is formed upon the surface 128 of the first back piece 114. Standard photolithographic process steps are utilized to fabricate the P2 pole tip 204 and the back piece 208, and a detailed description of the process steps is not necessary as they are well known to those skilled in the art. Basically, the steps include the deposition of a seed layer, followed by a photoresist layer that is subsequently patterned and the electroplating of the P2 pole tip 204 and back piece 208 into the patterned photoresist layer, followed by the removal of the photoresist layer and seed layer. The P2 pole tip 204 is generally centrally disposed relative to the P1 pedestal 110 and in alignment with the read head element 28.

Figure 16:
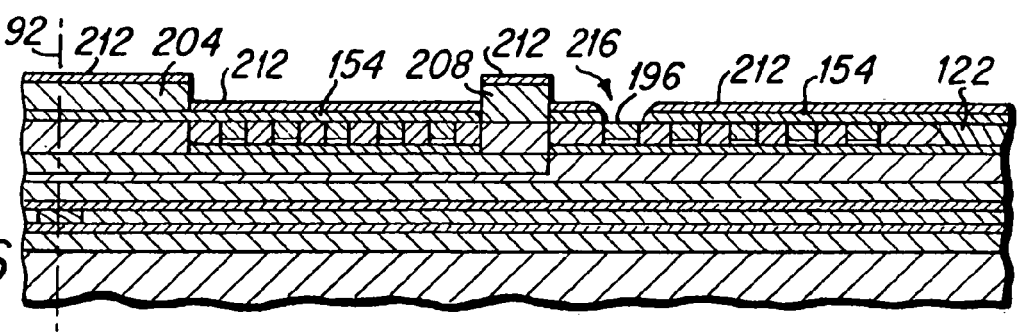
Figure 17:
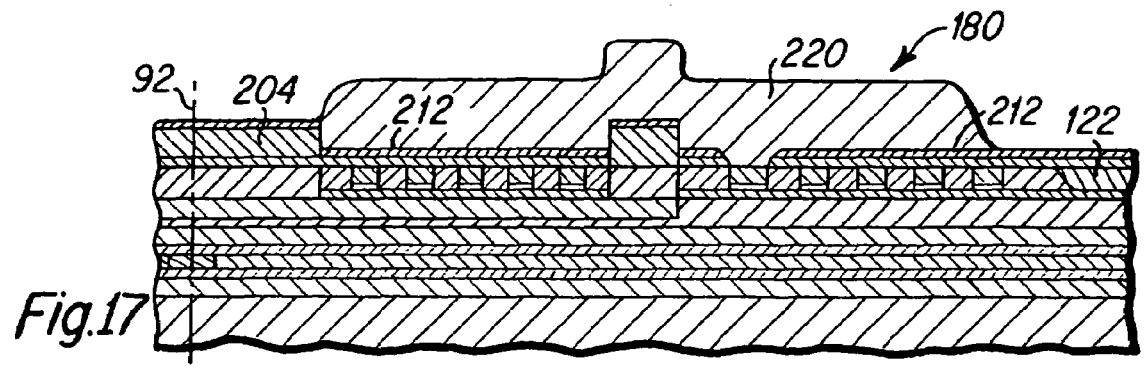
Figure 18:
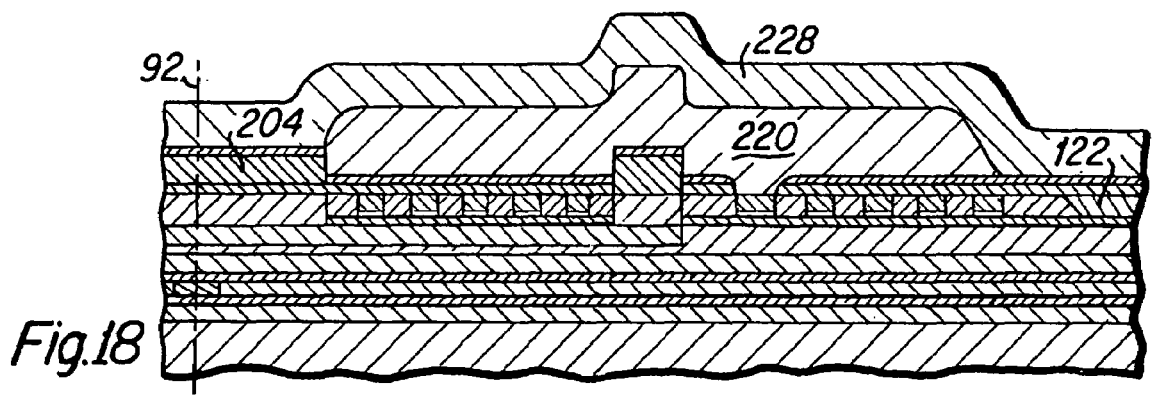
Figure 19:
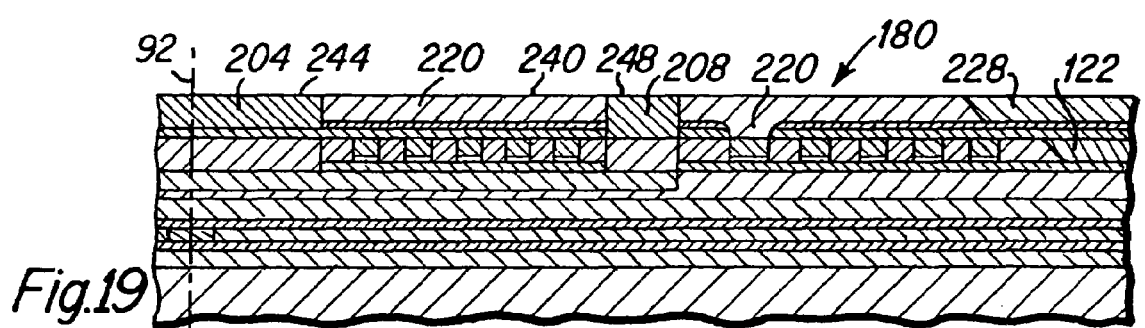
Figure 20:
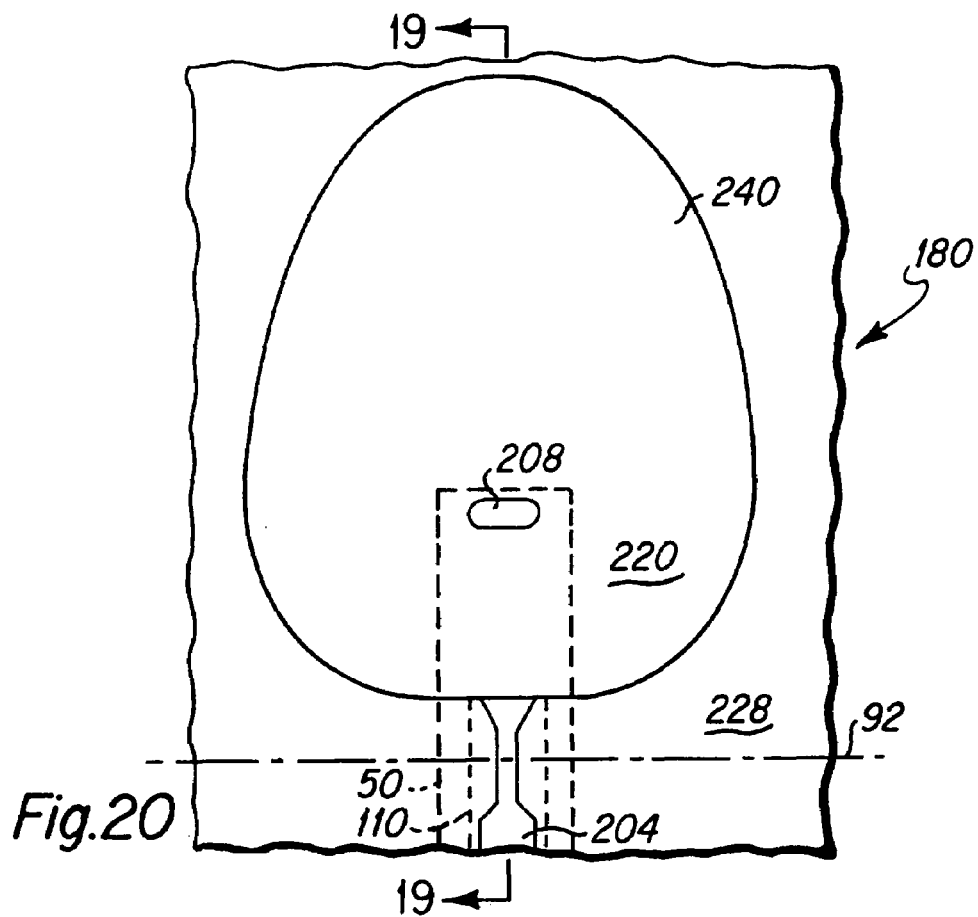

As is depicted in FIG. 16, a patterned second etch stop layer 212 may next be fabricated upon the wafer surface; where the write gap layer 154 is particularly thin, the etch stop layer 212 insures that etching through the write gap layer will not occur during the subsequent RIE etching step described below. The patterning of the second etch stop layer 212 includes a formation of openings 216 for connection to the electrical interconnects 196 fabricated in the first coil layer 150. Thereafter, as depicted in FIGS. 17 and 18, a patterned second etchable insulation material layer 220 is fabricated upon the etch stop layer 212; the layer 220 is preferably composed of a hard baked photoresist. The thickness of the layer 220 is generally thicker than the thickness of the P2 pole piece 204 which determines the thickness of the second induction coil trenches that will be fabricated therein, as is described below. As is best seen in the top view presented in FIG. 20 and described herebelow, the patterned hard baked photoresist 220 is shaped to cover the area in which the upper layer of the spiral induction coil is to be fabricated, and it is significant to note that the pattern of the hard baked resist 220 is specifically formed away from the ABS surface 92 that will subsequently be created in the fabrication of the magnetic head 180. The fabrication of the patterned hard baked photoresist insulation layer 220 is therefore similar to the photoresist layer 120 described hereabove. Exemplary materials of the layer 220 include the materials that were utilized in forming the first insulation layer 120, including polymeric materials such as hard baked novolac or F-containing low k polymer. Preferably the layers 220 and 120 are composed of the same material. As is next depicted in FIG. 18, an alumina fill layer 228 is next deposited across the surface of the wafer, preferably to a depth that exceeds the thickness of the P2 pole tip 204. Thereafter, as depicted in FIGS. 19 and 20, in which FIG. 20 is a top plan view of FIG. 19, a CMP step is conducted to remove excess alumina 228 and portions of the hard bake resist 220, and the portions of the second etch stop layer 212 that are deposited on top of the P2 pole tip 204 and the back gap 208, such that a flat surface 240 is formed and the upper surfaces 244 and 248 of the P2 pole tip 204 and back gap 208 respectively are exposed. The alumina fill 228 is located at the ABS surface 92, whereby the polishing of the ABS surface is facilitated.

Figure 21:
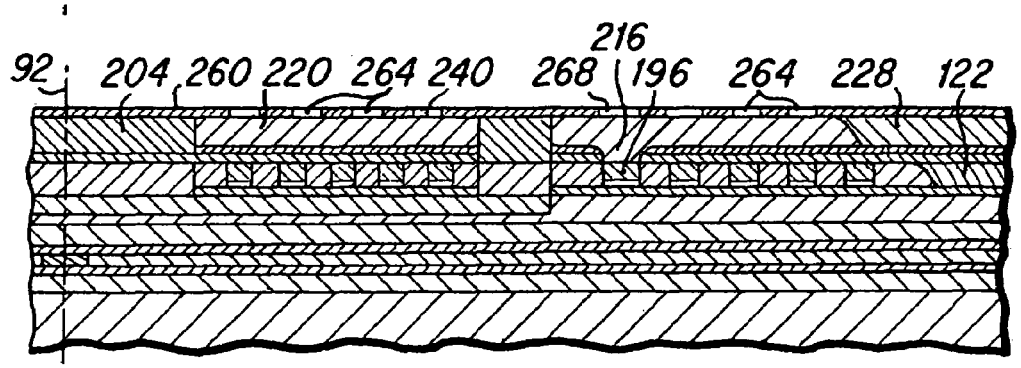

As depicted in FIG. 21, a patterned second induction coil etching mask 260 is next fabricated upon the top surface 240 of the layer 220. The pattered mask 260 includes openings 264 for the fabrication of a second layer of induction coil trenches, and an opening 268 for an electrical interconnect. The electrical interconnect opening 268 is therefore fabricated in alignment with the patterned opening 216 in the etch stop layer 212 and the electrical interconnects 196 of the first coil layer 150.

Figure 22:
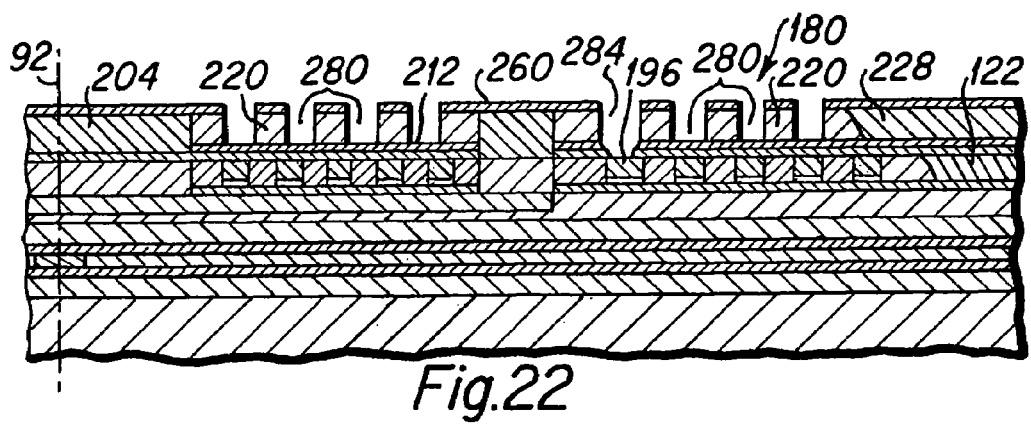

As is next depicted in FIG. 22, utilizing an ion etch process which is preferably a reactive ion etch (RIE) process, induction coil trenches 280 and an interconnect trench 284 are etched through the layer 220. The etching of the induction coil trenches 280 is halted by the etch stop layer 212, whereas the etching of the interconnect trench 284 continues until the electrical interconnect 196 of the first coil layer 150 is reached. Therefore, the relationship of the materials which comprise the RIE mask 260 and the second etch stop layer 212 and the second etchable insulation layer 220 must be such that during the RIE step, the material comprising the layer 220 is relatively easily etched, while the material comprising the RIE mask 260 and the etch stop layer 212 is significantly more slowly etched. As described hereabove, where the second etchable insulation material layer 220 is composed of an organic polymer such as a hard baked resist, a reactive ion etch process utilizing a gas such as oxygen can be utilized, and the RIE mask may consist of TaO or $SiO_2$ and etch stop layer 212 may preferably consist of $Al_2O_3$.

Figure 23:
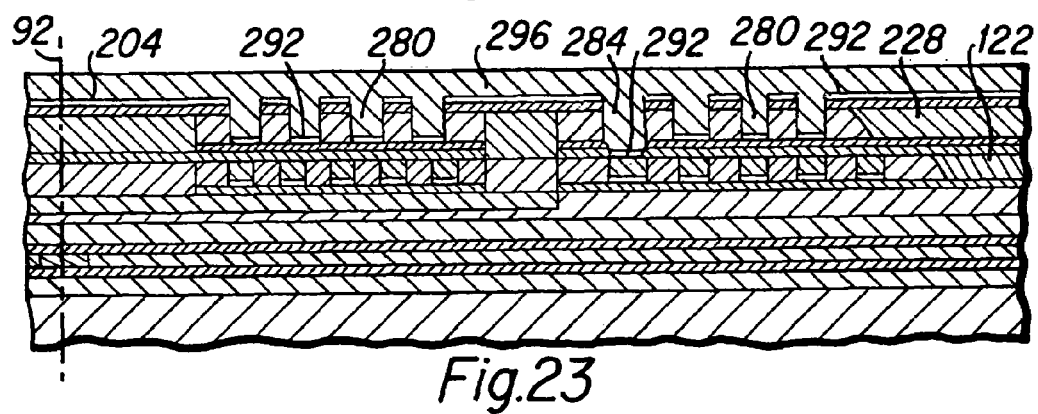
Figure 24:
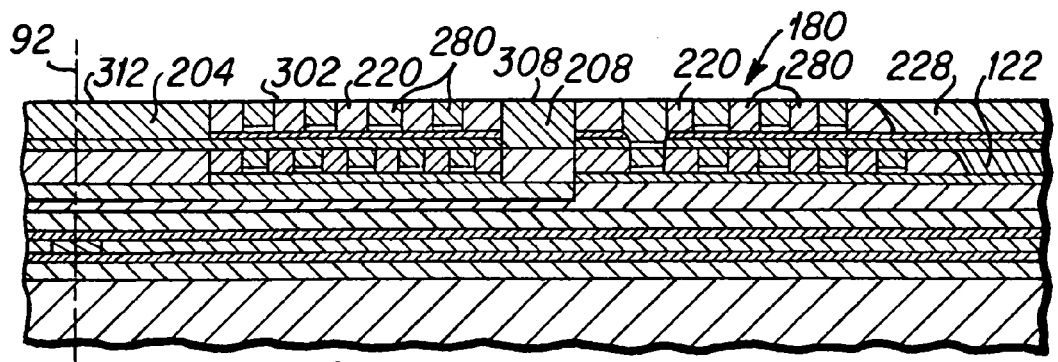

Thereafter, as depicted in FIG. 23, a seed layer 292 is next deposited onto the substrate and into the coil trenches 280. As is known in the art, a typical seed layer 292 is preferably a sputter deposited dual layer composed of a tantalum initial sublayer part and a copper subsequent sublayer part. An upper induction coil structure is then fabricated by electroplating induction coil material 296, such as copper into the coil trenches 280 in an electrodeposition process, as is well known to those skilled in the art. The copper filling can also be achieved by chemical vapor deposition methods. Thereafter, as depicted in FIG. 24, a CMP process step is conducted to remove the excess copper and the RIE mask 260, such that a flat upper surface 302 is formed. It is significant to note that the upper surface 308 of the back gap piece 208 and the upper surface 312 of the P2 pole tip 204 are exposed in this CMP process.

Figure 25:
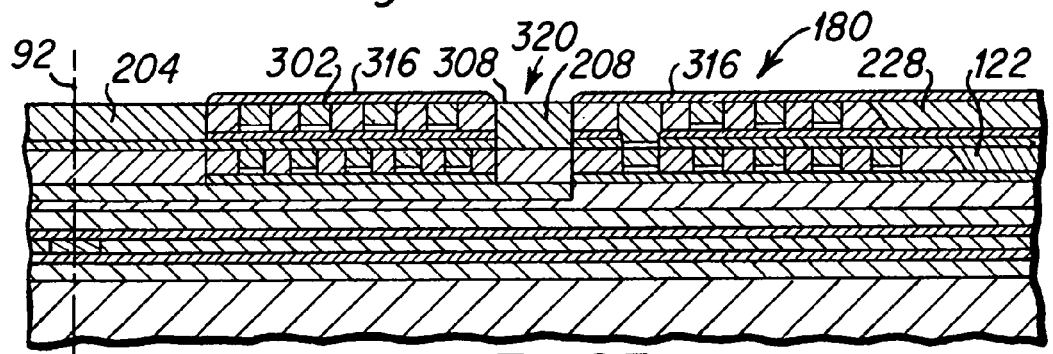
Figure 26:
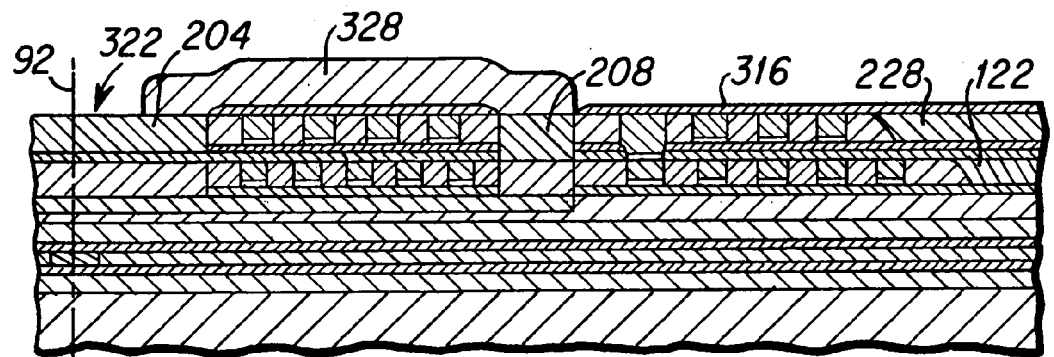
Figure 27:
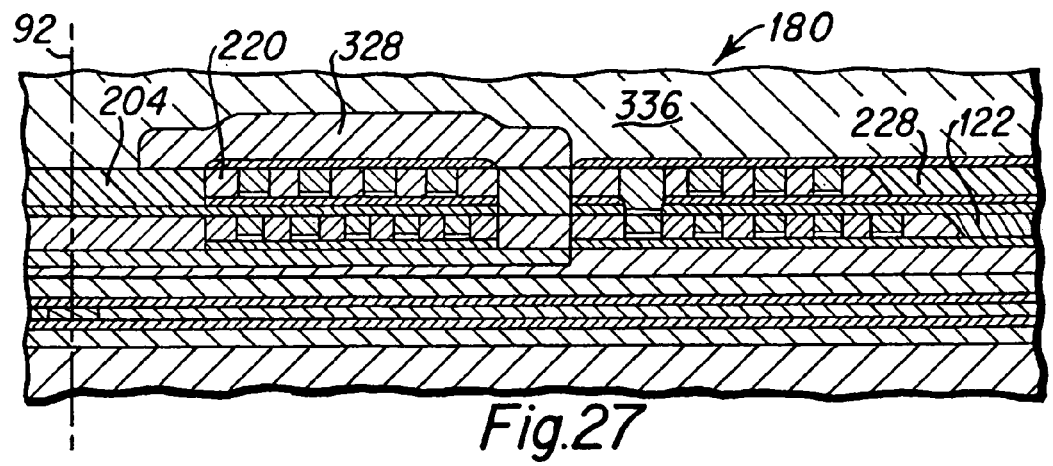

Next, as depicted in FIG. 25, a patterned insulative layer 316 is fabricated upon the upper surface 302 of the coil pattern with an opening 320 formed therein to provide for magnetic connection of a yoke member to the surface 308 of the back gap piece 208. Thereafter, as depicted in FIG. 26, using well known photolithographic techniques, the yoke portion 328 of the second magnetic pole layer is then fabricated onto the device to magnetically connect the P2 pole tip 204 with the back piece 208. A gap or recess 332 is preferably formed between the yoke 328 and the air bearing surface 92 that will ultimately be formed, as is well understood by those skilled in the art. Finally, further fabrication steps as are known in the art are then utilized to produce the electrical lead connections and, as depicted in FIG. 27, the magnetic head is then encapsulated 336, and further well known steps are taken, including slicing the wafer and heads for polishing the heads at the ABS surface 92, to form the completed magnetic head 180.

An alternative preferred embodiment 350 of the present invention can now be described based on an understanding of magnetic heads 100 and 180. Specifically, as described above, magnetic head 100 is formed with a single layer induction coil that is fabricated beneath the write gap layer 154 and between the P1 pole pedestal 110 and the back gap 114, and the magnetic head embodiment 180 includes a multiple layer coil wherein a first coil layer is fabricated below the write gap layer, and a second coil layer is fabricated above the write gap layer 154 between a P2 pole tip 204 and a back gap piece 208. The alternative magnetic head preferred embodiment 350, as depicted in FIG. 28, includes a single layer induction coil 354 that is fabricated above the write gap layer 154, between the P2 pole tip 204 and the back gap piece 208. A detailed description of the fabrication of this alternative embodiment 350 is substantially identical to the fabrication steps of the second layer of the multiple layer coil embodiment 180, and a further description thereof is not deemed necessary, in that one skilled in the art will well understand how to fabricate it in light of the preceding detailed description of the induction coil fabrication steps described hereabove. It is significant however to note that the hard baked resist 220 in which the induction coil 354 is fabricated, would also be patterned away from the ABS surface 92, such that no new material will be exposed on the ABS surface, which may affect the interaction between the head and the disk.

In a typical embodiment, the P1 pole pedestal 110 and P2 pole tip 204 have thicknesses of approximately 2 microns, such that the thickness of the coil turns 144 and 280 is approximately 2 microns. The width of the coil turns can be from approximately 0.75 microns to as narrow as approximately 0.25 microns, and an insulation width between the coil turns of approximately 0.15 to 0.25 microns is sufficient to separate the coil turns, such that the coil pitch of the present invention is from approximately 0.4 microns to approximately 1.0 microns. The aspect ratio (thickness/width) of the coil turns is from approximately 2.6 to approximately 8.

As can now be understood, each of the coil turns has a relatively narrow width and a relatively large thickness, such that each of the coil turns has a relatively high aspect ratio, and the pitch (or coil turn to coil turn distance) is thereby reduced. As indicated above, the reduction in the coil pitch means that the same number of coil turns will fit in a shorter space, such that the length of the yoke between the pole tip and the back gap piece is shortened, and the shortened yoke leads to a faster magnetic flux rise time, such that a higher data writing rate is obtained.

A further magnetic head embodiment 400 of the present invention is depicted in FIGS. 29 through 38 as are next described. Commencing with FIG. 29, a side cross-sectional view of a fabrication step of the magnetic head 400 is presented; the fabrication stage of the magnetic head 400 can be readily understood with reference to FIG. 8, described in detail hereabove, and wherein common structures are identified with identical numerals. Briefly, a P1 pole pedestal 110 and a back gap piece 114 are fabricated upon a P1 pole piece 50. Thereafter, an etch stop layer 116 has been deposited, followed by the fabrication of a patterned hard baked resist layer 120. An alumina fill layer 122 has been deposited, followed by a CMP step, such that the hard baked resist is located away from the ABS surface 92 and solely in the area where the induction coil is to be fabricated.

Figure 32:
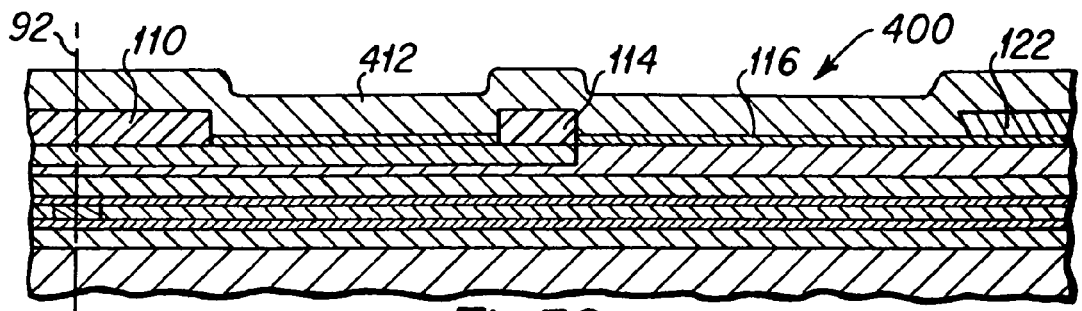
Figure 33:
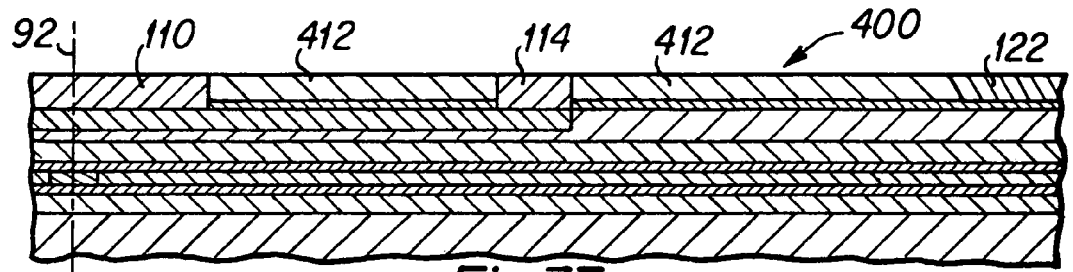

As depicted in FIGS. 30 and 31, wherein FIG. 30 is a cross-sectional view and FIG. 31 is a top plan view of FIG. 30, the fabrication of the magnetic head 400 proceeds from this point, with the step of removal of the hard baked resist 120 from the wafer, leaving a generally doughnut shaped cavity 408 in the locations in which an induction coil is to be fabricated. The back gap piece 114 is located in the center of the doughnut shaped cavity 408, and an oxygen RIE process is preferably (though not necessarily) utilized to remove the hard baked resist 120. Thereafter, as depicted in FIG. 32, a layer 412 of $SiO_2$ is deposited across the surface of the wafer in a depth sufficient to fill the cavity 408. As is next depicted in FIG. 33, a CMP process step is then performed to remove the excess $SiO_2$ from the surface of the wafer, such that the remaining $SiO_2$ layer 412 fills the cavity 408 previously filled by the hard baked resist 120. It is significant to understand that the $SiO_2$ material 412 is now located only in the doughnut shaped cavity 408, and is thus disposed away from the ABS surface location 92 of the magnetic head 400, just as the hard baked material 120 was located away from the ABS surface 92 in embodiments 100, 180 and 350, as has been discussed hereabove. This feature is significant because it has proven difficult to effectively polish the ABS surface 92 when $SiO_2$ material is located at the ABS surface, due to the relative hardness of $SiO_2$. Thus, by first fabricating the hard baked photoresist 120 in the induction coil location only, and then removing it and replacing it with $SiO_2$ material 412 that is similarly resident only in the induction coil area, the induction coil can now be fabricated in an $SiO_2$ layer 412 where the $SiO_2$ is formed away from the ABS surface 92.

Figure 34:
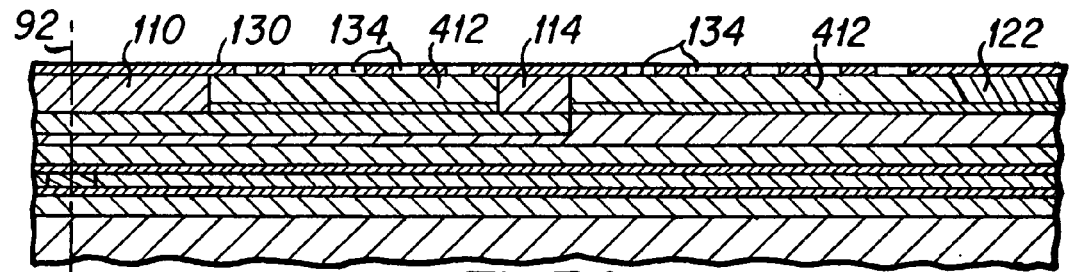
Figure 35:
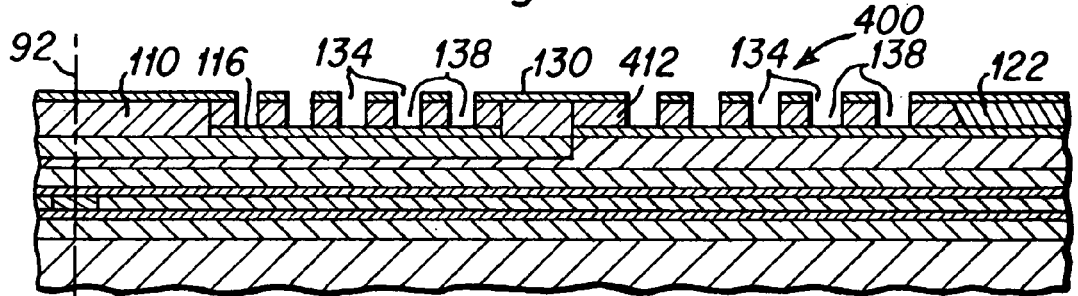

A next step in fabricating the magnetic head 400 is the fabrication of a patterned RIE mask 130 upon the $SiO_2$ insulation layer 412, as is depicted in FIG. 34, followed by openings 134 being formed in the RIE mask 130 at locations where induction coil trenches are desired. The RIE mask 130 can be fabricated using photoresist and the openings 134 found in a photolithographic process, when the photoresist is resistant to a fluorine species RIE process next described. Thereafter, as depicted in FIG. 35, an RIE etching step is conducted wherein the $SiO_2$ material 412 is effectively etched to create induction coil trenches 138, while the mask 130 and etch stop layer material 116 are not significantly etched. The etch stop layer 116 is preferably composed of $Al_2O_3$, and a fluorine containing gas such as $CF_4$ is utilized in the RIE process, because $SiO_2$ is substantially more easily etched by fluorine containing species than $Al_2O_3$.

Figure 36:
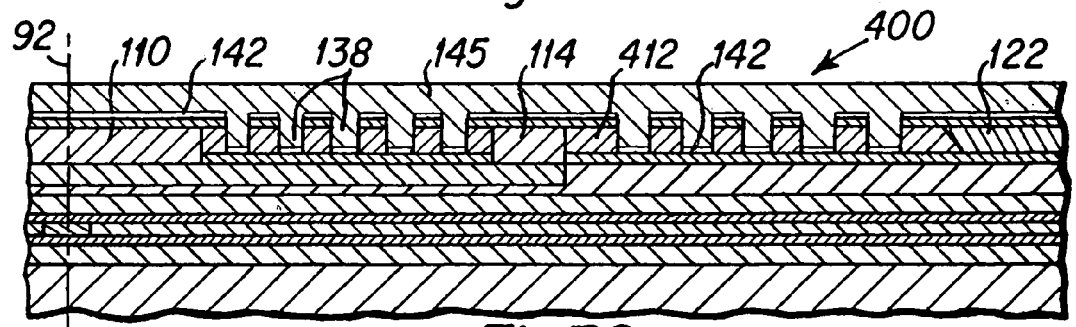
Figure 37:
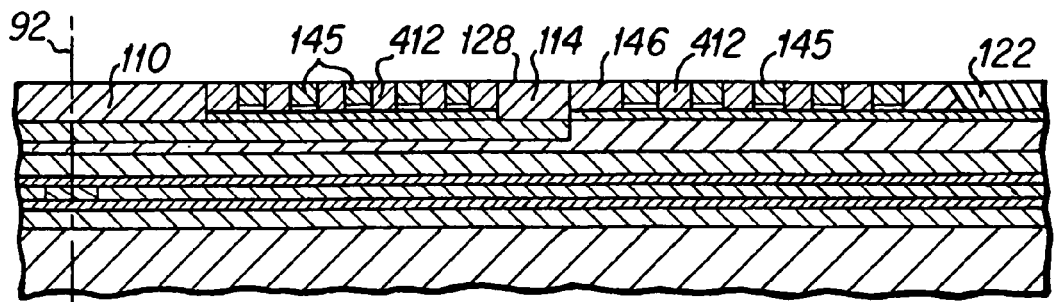
Figure 38:
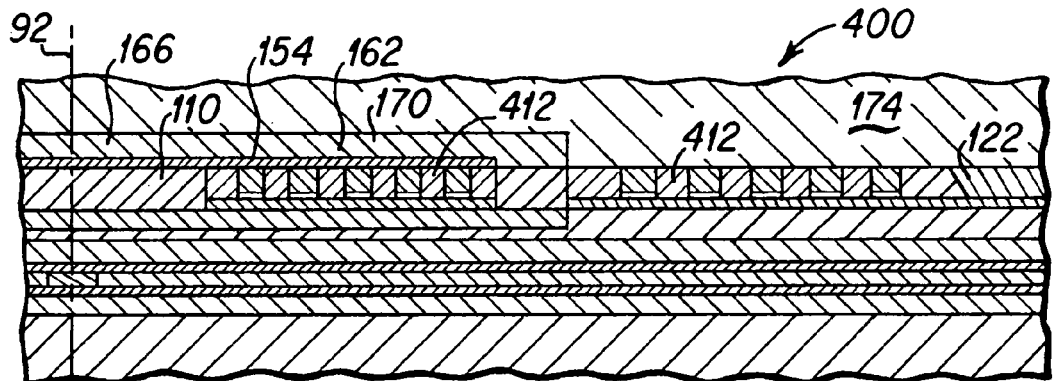

As is next depicted in FIG. 36, and as has been described hereabove, a copper induction coil is preferably fabricated into the induction coil trench by first depositing a seed layer 142, followed by the electroplating of copper 145 to fill the trenches 138. Thereafter, as depicted in FIG. 37, a CMP step is performed to yield a flat upper surface 146, wherein the upper surface 128 of the back gap piece 114 is exposed. As is depicted in FIG. 38, and described hereabove, a single layer induction coil magnetic head may be completed by the deposition of a write gap layer 154, followed by the fabrication of a P2 pole 162, including a pole tip portion 166 and a yoke portion 170, followed by further processing steps to ultimately complete the encapsulation 174 of the magnetic head, followed by the slicing of the wafer, fabrication of the ABS surface 92 and ultimately the complete fabrication of discrete magnetic heads. These various steps are well known to those skilled in the art.

Figure 39:
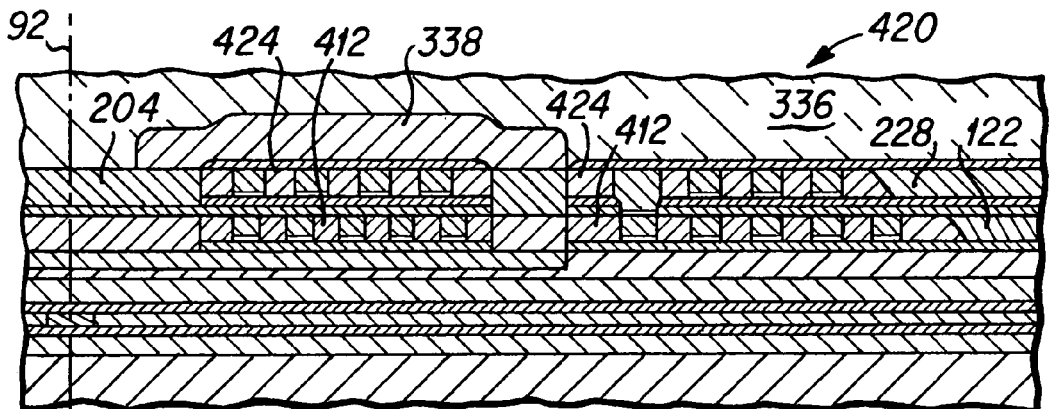
FIG. 39 is a cross-sectional view depicting yet another embodiment of the present invention.

Alternatively, as depicted in FIG. 39, a magnetic head 420 may be fabricated having a multiple layer induction coil, similar to that depicted in FIG. 27, but in which the hard baked resist 120 and 220 in both induction coil layers has been etched away and replaced with $SiO_2$ material 412 and 424 respectively, according to the process steps described above with reference to FIGS. 30-33 of the magnetic head 400.

Figure 40:
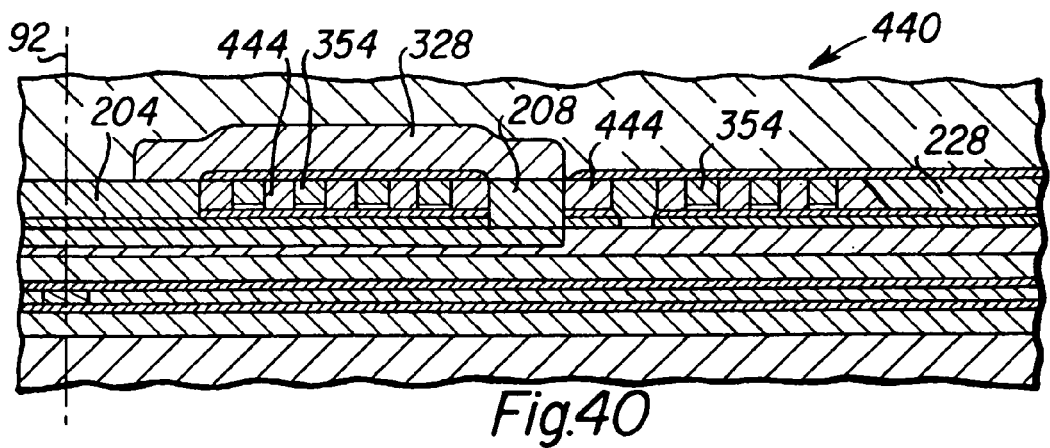
FIG. 40 is a side cross-sectional view depicting yet a further embodiment of the present invention.

Alternatively, as depicted in FIG. 40, a further magnetic head 440 may be fabricated having a single layer induction coil, similar to that depicted in FIG. 28, but in which the hard baked resist 220 in the induction coil layer has been etched away and replaced with $SiO_2$ material 444, according to the process steps described above with reference to FIG. 28 of the magnetic head 350.

A significant advantage of the magnetic heads, such as magnetic head 400, 420 and 440 in which the hard baked resist has been replaced by $SiO_2$, is that $SiO_2$ is a significantly better heat conductor than hard baked resist and has substantially less thermal expansion capacity. Thus, magnetic heads having an induction coil fabricated within $SiO_2$ will have less of a heat buildup problem than induction coils fabricated within hard baked resist. Heat buildup within a magnetic head can create performance problems, as is well known to those skilled in the art, particularly as the fine pitch coil dimensions decrease along with the size of other components of the magnetic head. The superior heat conducting properties of $SiO_2$ will therefore contribute to superior performance of the magnetic heads of the present invention as component dimensions are decreased.

While the present invention has been shown and described with regard to certain preferred embodiments, it is to be understood that those skilled in the art will no doubt devise certain alterations and modifications in form and detail hereof that nevertheless include the true spirit and scope of the invention. It is therefore intended that the following claims cover all such alterations and modifications hereof which nevertheless include the true spirit and scope of the invention.

What is claimed is:

1. A method for fabricating a magnetic head, comprising the steps of:
   determining a location of an air bearing surface (ABS) of the magnetic head;
   fabricating a write head above a substrate base, including the steps of:
      fabricating a first magnetic pole;
      fabricating an etch stop layer above said first magnetic pole;
      fabricating an electrical insulation layer directly upon said etch stop layer and above said first magnetic pole, such that no portion of said electrical insulation layer is disposed at said ABS location of the magnetic head;
      fabricating a fill layer around said electrical insulation layer, such that portions of said fill layer are disposed at said ABS location;
      fabricating an induction coil within said electrical insulation layer;
      fabricating a second magnetic pole above said induction coil.

2. A method for fabricating a magnetic head as described in claim 1 wherein said electrical insulation layer is composed of a substance selected from the group consisting of an organic polymer and $SiO_2$.

3. A method for fabricating a magnetic head as described in claim 2 wherein said fill layer is comprised of $Al_2O_3$.

4. A method for fabricating a magnetic head as described in claim 3 wherein said etch stop layer is comprised of $Al_2O_3$.

5. A method for fabricating a magnetic head as described in claim 1 wherein said induction coil is a single layer induction coil.

6. A method for fabricating a magnetic head as described in claim 1 wherein said induction coil is a multiple layer induction coil, and wherein each layer of said multiple layer coil is fabricated within a separate electrical insulation layer, and each said separate electrical insulation layer is fabricated within a separate fill layer, and wherein no portion of either said separate electrical insulation layer is fabricated at said ABS location, and wherein portions of each said fill layer are fabricated at said ABS location.

7. A method for fabricating a magnetic head as described in claim 1 including the further steps of fabricating a patterned etching mask upon said electrical insulation layer, and conducting a reactive ion etch process to etch induction coil trenches into said electrical insulation layer down to said etch stop layer.

8. A method for fabricating a magnetic head as described in claim 1 wherein said etch stop layer is comprised of $Al_2O_3$, and said electrical insulation layer is comprised of a material selected from the group consisting of an organic polymer and $SiO_2$.

9. A method for fabricating a magnetic head as described in claim 1 wherein said electrical insulation layer is comprised of an organic polymer and including the further steps of removing said organic polymer following said step of fabricating said fill layer; and depositing an $SiO_2$ electrical insulation layer in place of said organic polymer; and fabricating said induction coil within said $SiO_2$ electrical insulation layer.

10. A method for fabricating a magnetic head as described in claim 9 wherein said fill layer is comprised of $Al_2O_3$.

11. A method for fabricating a magnetic head as described in claim 1 wherein said induction coil is fabricated within said electrical insulation layer after said fill layer is fabricated.

\* \* \* \* \*